Figure 3:
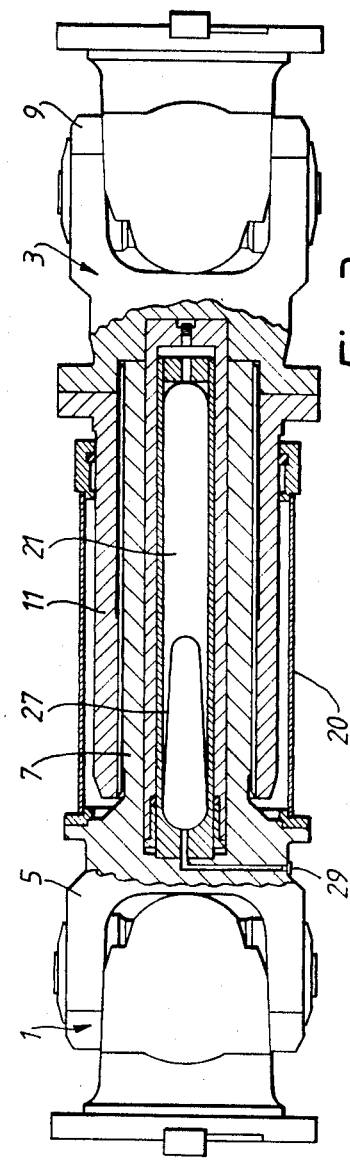

United States Patent [19]
Bathory et al.

[11] Patent Number: 4,945,745
[45] Date of Patent: Aug. 7, 1990

[54] TELESCOPIC DRIVE SPINDLE ASSEMBLY

[75] Inventors: Bela I. Bathory; Robert W. Gronbech; Michael Lister, all of Sheffield, England

[73] Assignee: Davy McKee (Sheffield) Limited, Sheffield, England

[21] Appl. No.: 318,668

[22] Filed: Mar. 3, 1989

[30] Foreign Application Priority Data

Mar. 11, 1988 [GB] United Kingdom ................. 8805839

[51] Int. Cl.⁵ ............................................ B21B 35/14
[52] U.S. Cl. ...................................... 72/249; 464/162
[58] Field of Search ................... 72/249; 464/162, 169

[56] References Cited
U.S. PATENT DOCUMENTS 3,618,340 11/1971 Geisthoff et al. .................... 464/162
4,003,219 1/1977 Stull ................................... 464/162
4,112,710 9/1978 Okuda et al. ........................ 464/169

Primary Examiner—Lowell A. Larson
Assistant Examiner—Schoeffler, T. C.
Attorney, Agent, or Firm—Lee, Mann, Smith, McWilliams & Sweeney

[57] ABSTRACT

A telescopic drive spindle assembly for a rolling mill permits the assembly to accommodate axial displacement of the roll. The assembly has first and second overlapping members with a piston in one member being displaceable in a cylinder in the other member. The piston defines a chamber and a quantity of gas in the chamber serves to urge the piston in the direction out of the cylinder so as to increase the effective length of the drive spindle.

4 Claims, 2 Drawing Sheets

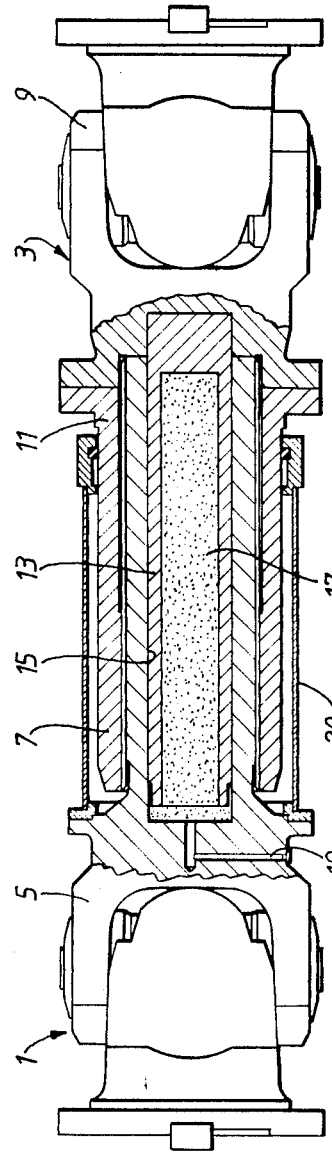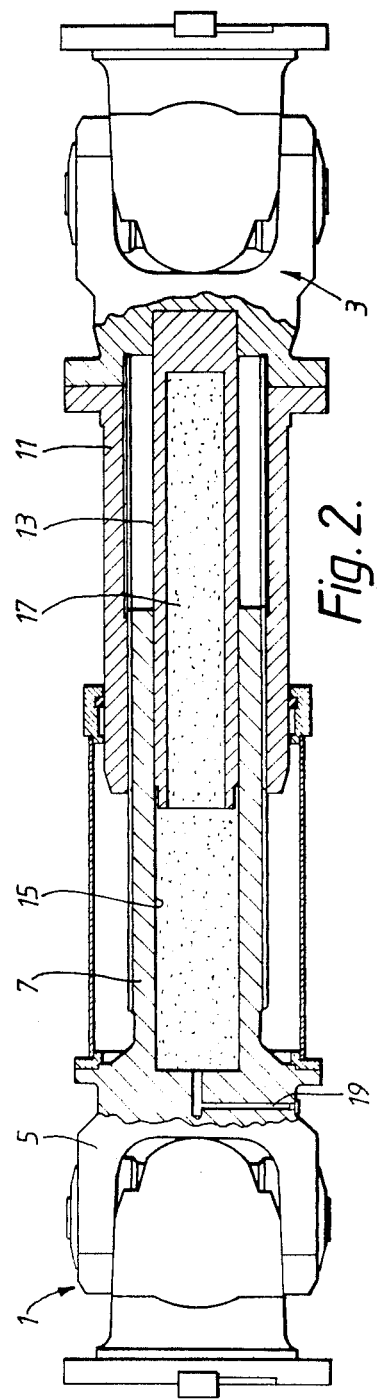

TELESCOPIC DRIVE SPINDLE ASSEMBLY

This invention relates to a telescopic drive spindle assembly for a rolling mill roll.

The rolls of a rolling mill are usually driven from a drive shaft by way of a drive spindle. Couplings are usually provided at each end of the spindle, one being connected to the drive shaft and the other to the end of the roll to be driven. If the rolls of the rolling mill do not move axially, the spindles can be of constant length, but if, as is becoming more usual, the work rolls have to be axially displaceable as well as rotatable, the drive spindles for these rolls have to be able to accommodate this axial movement. Furthermore, if the roll is movable axially, care has to be taken to ensure that the end of the roll does not become detached from the coupling at the end of the drive spindle assembly.

It is an object of the present invention to provide a telescopic drive spindle assembly which is suitable for use with a mill roll which is movable axially.

According to the present invention, a telescopic drive spindle assembly for a rolling mill roll comprises a first member adapted for connection to drive means for rotating the roll and having an elongate cylindrical portion; a second member adapted for connection to one end of the mill roll and having an elongate cylindrical portion; said cylindrical portions being in telescopic overlapping relation and in angular driving relation with each other; one of the members having a piston which is located in a cylinder defined by the other member, said piston being displaced in the direction into the cylinder as the overlap between the cylindrical portions is increased; said piston defining a chamber which is in communication with the cylinder and with a compressible gas in the chamber which serves to urge the piston in the direction out of the cylinder.

By arranging for the elongate portions to be arranged in telescopic overlapping relation, the overall length of the spindle assembly can be adjusted when the roll which is driven by the spindle assembly is moved in its axial direction. The purpose of the compressible gas in the chamber is to bias the two members of the spindle assembly apart so that the spindle remains connected to the rolling mill roll when the roll is moved in its axial direction away from the drive shaft.

Figure 4:
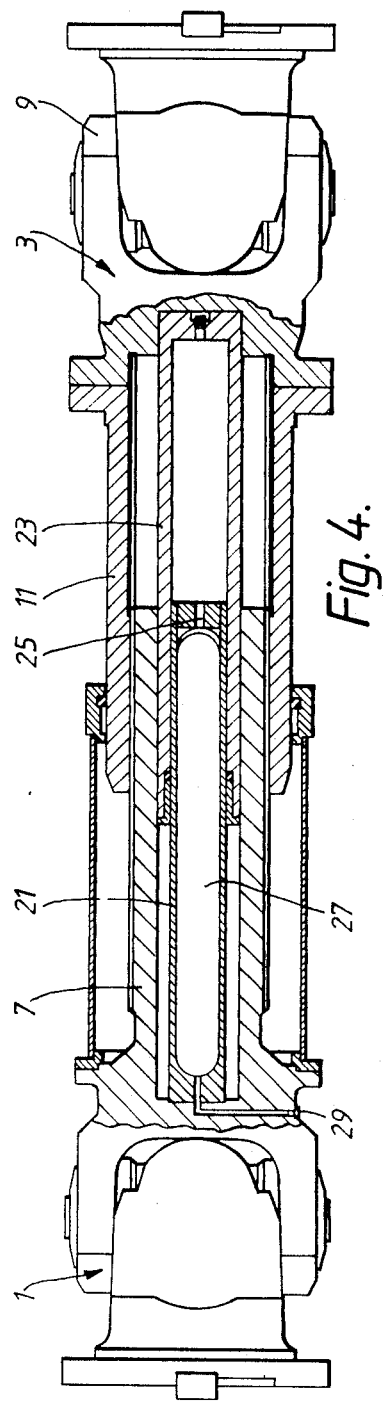

In order that the invention may be more readily understood, it will now be described, by way of example only, with reference to the accompanying drawings, in which:

FIGS. 1 and 2 are side elevations, partly in section, of a drive spindle assembly in accordance with one embodiment of the invention, in FIG. 1 the assembly being in its compressed state and in FIG. 2 the assembly is shown in its expanded state; and FIGS. 3 and 4 are side elevations, partly in section, of an alternative form of drive spindle assembly, with FIG. 3 showing the assembly in its compressed state and FIG. 4 showing the assembly in its expanded state.

In the figures, a drive spindle assembly comprises first and second members 1, 3 which are adapted for connection to the drive shaft and to the rolling mill roll, respectively. The member 1 consists of a cup-shaped part 5 connected to an elongate cylindrical portion 7. Similarly, member 3 has a cup-shaped portion 9 connected to an elongate cylindrical portion 11. The portions 7, 11 are arranged in telescopic overlapping relation and the outer surface of the portion 7 and the inner surface of the portion 11 are correspondingly splined so that, although the two portions can slide relative to each other, they are in angular driving relation.

Referring now to FIGS. 1 and 2, the member 3 carries a tubular piston 13 which is located coaxially of the portion 11 and it is a sliding fit in a cylinder 15 defined by the portion 7. The piston 13 is hollow and its bore 17 serves as a chamber in communication with the cylinder 15. A port 19 formed in the member 1 leads to the cylinder 15. A compressible gas is introduced into the cylinder 15 via the port and the port is then closed off. The pressure of the gas is such as to force the piston 13 in the direction out of the cylinder 15 and this causes the member 3 to be biased away from the member 1.

In the expanded position shown in FIG. 2, the spindle assembly provides the drive to the roll when the roll has been moved axially to the position where it is furthest away from the drive shaft. If the roll is displaced axially to a position where it is closer to the drive shaft, the movement of the roll forces the member 3 towards the member 1 so that the degree of overlap between the portions 7, 11 is increased, as shown in FIG. 1. At the same time, the piston 13 moves into the cylinder 15 to compress the gas therein. The compressed gas thus acts as a spring which serves to bias the members 1, 3 apart. A slidable cover member 20 protects the splines on the two members.

In the embodiment of the invention shown in FIGS. 3 and 4, the member 1 carries a piston 21 which is slidable within a hollow cylinder 23 carried by the member 3. The piston 21 is hollow and the interior of the piston is in communication with the interior of the cylinder 23 by way of a port 25 at the outer end of the piston. An expandible bladder 27 is located within the piston 21 and the interior of the bladder is in communication with the exterior of the spindle assembly through a duct 29 which can be closed off. The bladder contains a quantity of gas, such as nitrogen. Also contained with the piston and the cylinder 23 is a hydraulic liquid. In the position shown in FIG. 3, the portions 7, 11 are arranged in their extreme overlapping relation and the gas in the bladder 27 has been compressed by the hydraulic liquid contained in the piston. The gas in the bladder 27 will expand to almost completely fill the hollow piston if it is given the opportunity to do so. Such an expansion of the bladder forces out almost all the liquid in piston 21 into the cylinder 23 thus forcing the member 3 away from the member 1. The length of the spindle assembly is thus increased. Compression of the spindle in its axial direction causes the liquid to be forced into piston 21 and the gas in the bladder 27 to be compressed.

We claim:

1. A telescopic drive spindle assembly for a rolling mill roll comprising a first member adapted for connection to drive means for rotating the roll and having an elongate cylindrical portion; a second member adapted for connection to one end of the mill roll and having an elongate cylindrical portion; said cylindrical portions being in telescopic overlapping relation and in angular driving relation with each other; one of the members having a piston which is located in a cylinder defined by the other member; said piston being displaced in the direction into the cylinder as the overlap between the cylindrical portions is increased; said piston defining a chamber which is in communication with the cylinder and including a compressible gas in the chamber which serves to urge the piston in the direction out of the cylinder; and including means for introduction of said gas into and withdrawal of said gas from said chamber.

2. A telescopic drive spindle assembly as claimed in claim 1, in which the cylindrical portion of the second member is of tubular form and fits around the cylindrical portion of the first member and cooperating splines on the inside of the cylindrical portion of the second member and on the outside of the cylindrical portion of the first member, respectively, provide the driving relation between the two members.

3. A telescopic drive spindle assembly as claimed in claim 1, in which the piston is provided on the second member and is coaxially within the elongate cylindrical portion thereof.

4. A telescopic drive spindle assembly as claimed in claim 1, in which the compressible gas is contained in an expandible bladder located in the chamber and a quantity of hydraulic liquid is present in the chamber and the cylinder.

* * * * *